(12) United States Patent
Vos et al.

(10) Patent No.: US 11,202,324 B2
(45) Date of Patent: Dec. 14, 2021

(54) METHODS AND APPARATUSES FOR USER EQUIPMENT ACCESS TO A WIRELESS COMMUNICATION SYSTEM

(71) Applicant: SIERRA WIRELESS, INC., Richmond (CA)

(72) Inventors: Gustav Gerald Vos, Surrey (CA); Steven John Bennett, Coquitlam (CA); Ali Cagatay Cirik, Herndon, VA (US); Naveen Mysore Balasubramanya, Edinburgh (GB); Lutz Hans-Joachim Lampe, Vancouver (CA)

(73) Assignee: SIERRA WIRELESS, INC., Richmond (CA)

( * ) Notice: Subject to any disclaimer, the term of this patent is extended or adjusted under 35 U.S.C. 154(b) by 0 days.

(21) Appl. No.: 15/721,374

(22) Filed: Sep. 29, 2017

(65) Prior Publication Data
US 2018/0098360 A1    Apr. 5, 2018

Related U.S. Application Data

(60) Provisional application No. 62/402,780, filed on Sep. 30, 2016.

(51) Int. Cl.
*H04W 74/08*    (2009.01)
*H04W 4/00*    (2018.01)
(Continued)

(52) U.S. Cl.
CPC ......... *H04W 74/0858* (2013.01); *H04W 4/70* (2018.02); *H04W 56/0045* (2013.01);
(Continued)

(58) Field of Classification Search
CPC ............ H04W 74/0858; H04W 4/005; H04W 76/046; H04W 72/14; H04W 28/046;
(Continued)

(56) References Cited

U.S. PATENT DOCUMENTS

2007/0058585 A1*  3/2007  Mudigonda ........... H04W 36/10
                                                                    370/331
2008/0182594 A1   7/2008  Flore et al.
(Continued)

FOREIGN PATENT DOCUMENTS

EP    2557890 A1    2/2013
EP    3498035 A1    6/2019
(Continued)

OTHER PUBLICATIONS

3GPP TSG RAN WG2 Meeting #95, R2-165004, Aug. 2016, 5 pages.
(Continued)

*Primary Examiner* — Faisal Choudhury
(74) *Attorney, Agent, or Firm* — Perkins Coie LLP (57) ABSTRACT

The present disclosure provides a grant free state for user equipment, for example a machine type communication (MTC) UE. There is provided a method for transitioning a state of a User Equipment (UE). The method includes determining, by the UE, if data is to be sent and transitioning, by the UE, to a grant free state when no data is to be sent, wherein transitioning to the grant free state includes receiving a grant free identifier (GF-ID). In some embodiments, the method further includes in accordance with a determination that an amount of data to be sent is below a threshold, transmitting, by the UE, the data together with the GF-ID. In addition, user equipment and base transceiver stations are provided each of which include a processor and memory having instructions stored thereon, which when executed by the processor configure the respective UE or BTS to perform the respective methods.

21 Claims, 5 Drawing Sheets

(51) Int. Cl.
  *H04W 4/70* (2018.01)
  *H04W 76/27* (2018.01)
  *H04W 56/00* (2009.01)
  *H04W 72/04* (2009.01)
  *H04W 72/14* (2009.01)

(52) U.S. Cl.
  CPC ......... *H04W 72/042* (2013.01); *H04W 72/14* (2013.01); *H04W 76/27* (2018.02)

(58) Field of Classification Search
  CPC . H04W 56/0045; H04W 72/042; H04W 4/70; H04W 76/27
  USPC .......................................................... 370/329
  See application file for complete search history.

(56) References Cited

U.S. PATENT DOCUMENTS

| | | | | |
|---|---|---|---|---|
| 2013/0028237 | A1* | 1/2013 | Cheng | H04W 36/0033 370/331 |
| 2014/0192767 | A1 | 7/2014 | Au et al. | |
| 2014/0362800 | A1* | 12/2014 | Mueller | H04W 76/20 370/329 |
| 2016/0112992 | A1* | 4/2016 | Bhushan | H04L 5/0005 370/330 |
| 2016/0227481 | A1 | 8/2016 | Au et al. | |
| 2017/0288817 | A1* | 10/2017 | Cao | H04L 1/1812 |
| 2017/0318584 | A1* | 11/2017 | Zeng | H04W 52/02 |
| 2017/0367110 | A1* | 12/2017 | Li | H04W 74/0816 |
| 2017/0367116 | A1* | 12/2017 | Li | H04W 72/048 |
| 2018/0092125 | A1* | 3/2018 | Sun | H04W 74/02 |
| 2018/0124598 | A1* | 5/2018 | Zeng | H04W 12/08 |
| 2018/0145790 | A1* | 5/2018 | Xu | H04W 72/0413 |
| 2019/0327030 | A1* | 10/2019 | Yoshimoto | H04L 1/1858 |

FOREIGN PATENT DOCUMENTS

| | | |
|---|---|---|
| WO | 2016068776 A1 | 5/2016 |
| WO | 2016089349 A1 | 6/2016 |
| WO | 2018058255 A1 | 4/2018 |

OTHER PUBLICATIONS

3GPP TSG RAN WG2 Meeting #95, R2-165122, Aug. 2016, 5 pages.
Abebe et al., "Comprehensive Grant-Fee Random Access for Massive & Low Latency Communication" IEEE ICC 2017 Wireless Communication Symposium (May 2017), 6 pages.
Ericsson—"State transition and small data transmission for inactive UEs"—3GPP TSG-RAN WG2 #95 Tdoc, R2-165538 (Aug. 2016), 5 pages.
International Search Report dated Jan. 8, 2018, for corresponding PCT Application No. PCT/CA2017/051164 (WO 2018/058255); 5 pages.
Sierra Wireless—"Transmission of Data Grant-Fee in New State"—3GPP TSG RAN WG2 Meeting #95bis R2-166059 (Oct. 2016), 8 pages.
Written Opinion dated Jan. 8, 2018, for corresponding PCT Application No. PCT/CA2017/051164 (WO 2018/058255); 7 pages.
Zte et al.—"Motivation of Study on 5G Non-orthogonal Multiple Access"—3GPP TSG RAN# 74, RP-162483 (Dec. 2016), 9 pages.
3rd Generation Partnership Project; Technical Specification Group Services and System Aspects; Study on architecture enhancements for Cellular Internet of Things (Release 13), 3GPP Draft; 23.730 v13.0.0, Mar. 2016; XP051086108; 97 pages.
Extended European Search Report for European Application No. 17854304.7; dated May 14, 2020; 14 pages.
Sierra Wireless; "Transmission of Data Grant-Free in Inactive State", 3GPP Draft; R2-168595, Nov. 2016; 10 pages.
Office Action dated Mar. 5, 2021 for corresponding European application No. 17854304.7; 10 pages.

* cited by examiner

METHODS AND APPARATUSES FOR USER EQUIPMENT ACCESS TO A WIRELESS COMMUNICATION SYSTEM

CROSS REFERENCE TO RELATED APPLICATIONS

This application claims the benefit of and priority to U.S. Provisional Patent Application Ser. No. 62/402,780 filed on Sep. 30, 2016 and entitled METHODS AND APPARATUSES FOR USER EQUIPMENT ACCESS TO A WIRELESS COMMUNICATION SYSTEM, the contents of which are incorporated herein by reference.

TECHNICAL FIELD

The present disclosure pertains in general to wireless communications and in particular to methods and apparatuses for user equipment access to a wireless communication system, for example machine type communication devices.

BACKGROUND

The characteristics of mobile machine-type communications (mMTC) are different from traditional cellular communications. Mobile MTCs typically have features including; a potentially huge number of connected terminals/devices; low data-rates and small-sized packets; sporadic infrequent communication and uplink (UL) centric traffic.

In addition, based on newly defined categories of service, for example the ultra reliable low latency communications (URLLC) category of service, requirements relating to delay of small packets and reliability may be very tight. Accordingly, a new access scheme to meet these very tight requirements is desired.

Therefore there is a need for methods and apparatus for mobile machine type communication access to a wireless communication system that is not subject to one or more limitations of the prior art.

This background information is provided for the purpose of making known information believed by the applicant to be of possible relevance to the present disclosure. No admission is necessarily intended, nor should be construed, that any of the preceding information constitutes prior art against the present disclosure.

SUMMARY

An object of the present disclosure is to provide methods and apparatuses for mobile machine type communication (mMTC) access to a wireless communication system. According to embodiments, there is provided a UE operational state which provides for Grant Free communication with a base transceiver station (BTS) for data transmission.

In accordance with embodiments of the present disclosure, there is provided a method for transitioning a state of a User Equipment (UE). The method includes determining, by the UE, if data is to be sent and transitioning, by the UE, to a grant free state when no data is to be sent, wherein transitioning to the grant free state includes receiving a grant free identifier (GF-ID).

In some embodiments, the concept of when no data is to be sent can be used to define that there is no currently pending data to be sent. In some embodiments the concept of when no data is to be sent can be used to define that there that there is no data to be sent for a predetermined time period.

In some embodiments, the method further includes in accordance with a determination that an amount of data to be sent is below a threshold, transmitting, by the UE, the data together with the GF-ID.

In accordance with embodiments of the present disclosure, there is provided a method for transmitting data by a UE. The method includes determining, by the UE, if an amount of data to be sent exceeds a threshold and transmitting, by the UE, data to a base transceiver station (BTS), together with a grant free identifier (GF-ID) when the amount of data is below the threshold.

In accordance with embodiments of the present disclosure, there is provided a UE including a processor and a memory having stored thereon instructions, which when executed by the processor configure the UE to perform the methods defined above.

In accordance with embodiments of the present disclosure, there is provide a method for receiving data from a UE. The method includes transmitting, by a base transceiver station (BTS), a grant free identifier (GF-ID) to the UE and receiving, by the BTS, data together with the GF-ID.

In some embodiments, the method further includes transmitting, by the BTS, a grant free failed indication in accordance with a determination that an amount of the data is above a threshold.

In accordance with embodiments of the present disclosure, there is provided a BTS including a processor and memory having stored there on instructions, which when executed by the processor configure the BTS to perform the methods defined above.

In accordance with another aspect of the present disclosure, there is provided a method for transitioning a state of the UE. The method including determining if data is to be sent and transitioning to a grant free state when no more data is to be sent at the current time, transitioning to the grant free state include receiving a grant free identifier, GF-ID.

In accordance with another aspect of the present disclosure, there is provided a method for transmitting data by a UE. The method including determining if an amount of data to be sent exceeds a threshold. The method further includes transmitting the amount of data to a base transceiver station, BTS, together with a grant free identifier, GF-ID when the amount of data is below the threshold.

In accordance with another aspect of the present disclosure, there is provided a system enabling data transmission by a User Equipment (UE). The system includes a UE having a UE operational state controller configured to manage operational states of the UE, the operational states including a grant free state and; and a BTS having a BTS operational controller configured to manage operational states of the UE by interaction with the UE operational state controller.

BRIEF DESCRIPTION OF THE DRAWINGS

These and other features will become more apparent in the following detailed description in which reference is made to the appended drawings.

DETAILED DESCRIPTION

Figure 1:
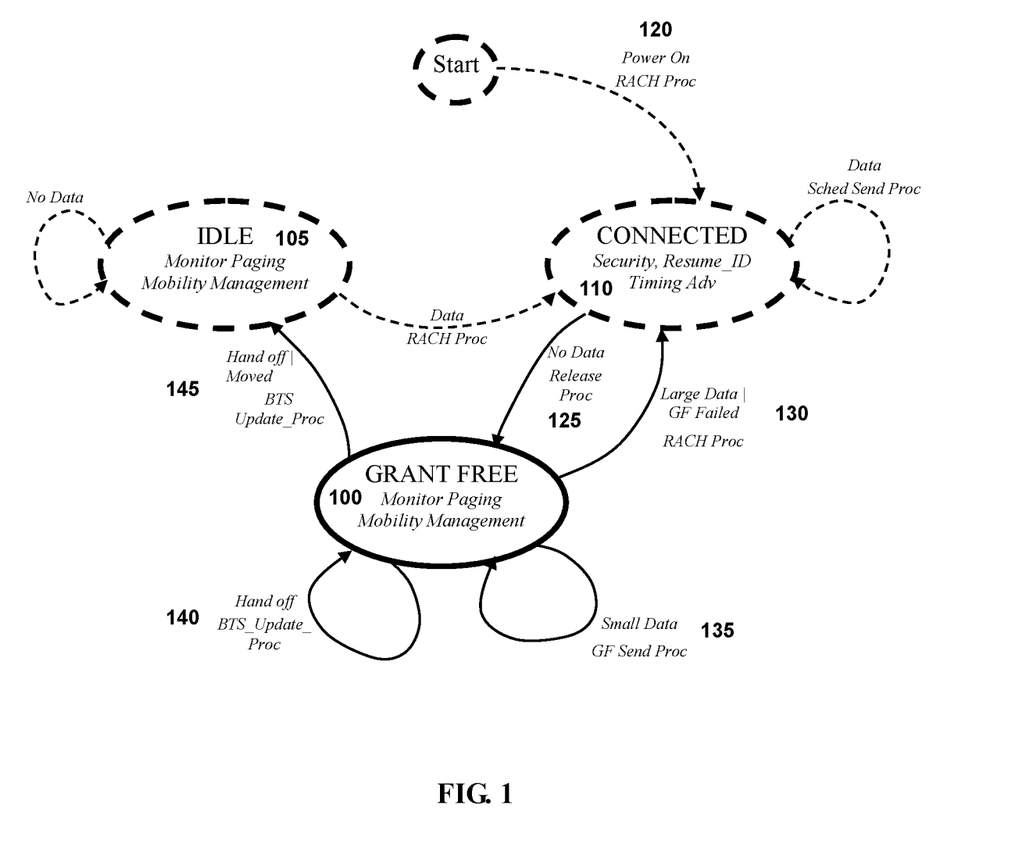
FIG. 1 illustrates schematically the interconnection of a grant free state with the idle state and connected state of a user equipment (UE) in accordance with embodiments of the present disclosure.

The present disclosure provides a grant free state for a user equipment, for example machine type communication (MTC) UE. With reference to FIG. 1, the interconnectivity between the Grant Free State 100, Idle State 105 and the Connected State 110 are illustrated.

On power up, the random access channel (RACH) procedure 120 is completed to get to the connected state where security, authentication, Resume ID, and a valid timing advance (TA) are obtained. In some embodiments, a grant free ID is also assigned during the RACH procedure.

Figure 2A:
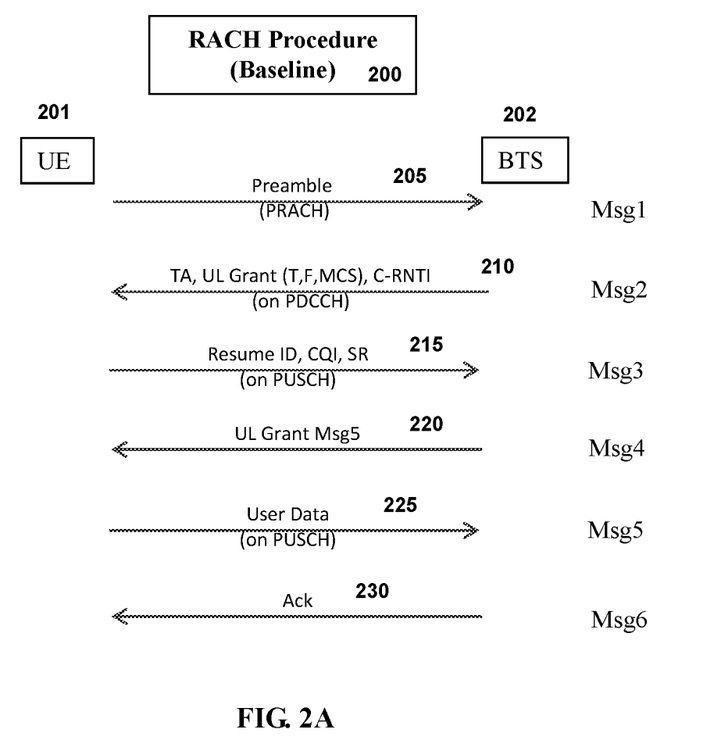
FIG. 2A illustrates a random access channel (RACH) procedure in accordance with embodiments of the present disclosure.

FIG. 2A illustrates a RACH procedure 200 which is performed using the baseline method, according to embodiments of the present disclosure. In this procedure in Msg1 205 the UE 201 sends a preamble (PRACH) which can indicate to a base transceiver station (BTS) 202 that a UE wants to obtain a Msg3 215 allocation and tells the BTS the UE's initial timing estimate for data transmission. In Msg2 210, the BTS 202 sends a message back to the UE 201 which contains a Timing Advance (TA) adjustment and the uplink (UL) grant (which includes resource allocation) for Msg3 215 on physical uplink shared channel (PUSCH). A temporary C-RNTI (e.g. a 16-bit value) is also included Msg2 210, which the UE uses to scramble Msg3 215. The temporary cell radio network temporary identifier (temporary C-RNTI) is promoted to C-RNTI for a UE which detects random access (RA) success and does not already have a C-RNTI. The UE 201 responds in Msg3 215 with the resume ID (used to link to security and connection parameters). The resume ID is a value, for example a 40 bit value, which would have been obtained after the first transition out of the radio resource control (RRC) connected state. It is understood that if the RACH procedure is being performed at a power on start up of the UE, the RACH procedure may not include the transmission of a resume ID from the UE to the BTS. Msg3 215 further contains an indication of the quality of the connection. According to embodiments, Msg3 215 further includes a Service Request (SR) which indicates how much data the UE 201 needs to send. The BTS 202 sends Msg4 220 which contains the UL grant resource allocation for Msg5 225, this may be based on the service request if a service request was included in Msg3 215. The UE 201 subsequently sends Msg5 225 with the data on the physical uplink shared channel (PUSCH). The BTS 202 subsequently sends in Msg6 230, an acknowledgement or negative acknowledgement of receipt of the data.

It is understood that while the term base transceiver station (BTS) is used, this general language can at equally be replaced with the terms, base station, evolved NodeB (eNB), gNodeB (gNB), NodeB or other base station configuration. It is to be understood that discussion of the instant technology with respect to current Long Term Evolution (LTE) nomenclature is not to be construed as being limited and the functionality of a BTS as defined herein can be relevant to other communication network configurations.

Figure 2B:
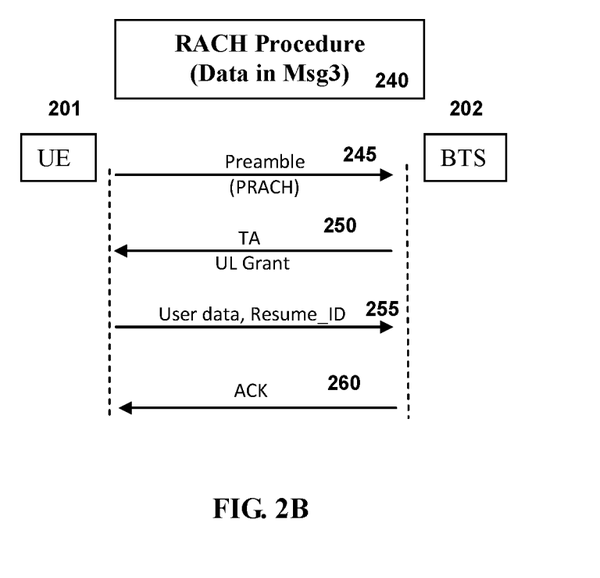
FIG. 2B illustrates a random access channel (RACH) procedure in accordance with embodiments of the present disclosure.

FIG. 2B illustrates a RACH procedure 240 which is performed using a procedure according to embodiments of this disclosure with data sent from the UE in Msg3 255. This RACH procedure is similar to the baseline procedure however the Data in Msg3 procedure skips the transmission of the SR and sends a resume ID together with the data. In further detail, in Msg1 245 a preamble is sent (PRACH) from the UE 201 to the base transceiver station (BTS) 202, which responds in Msg2 250 with a timing advance (TA) and an uplink (UL) grant. The UE 201 subsequently, in Msg3 255, sends the data and Resume ID and the BTS 202 subsequently sends in Msg4 260, an acknowledgement or negative acknowledgement of the receipt of the data.

Figure 2C:
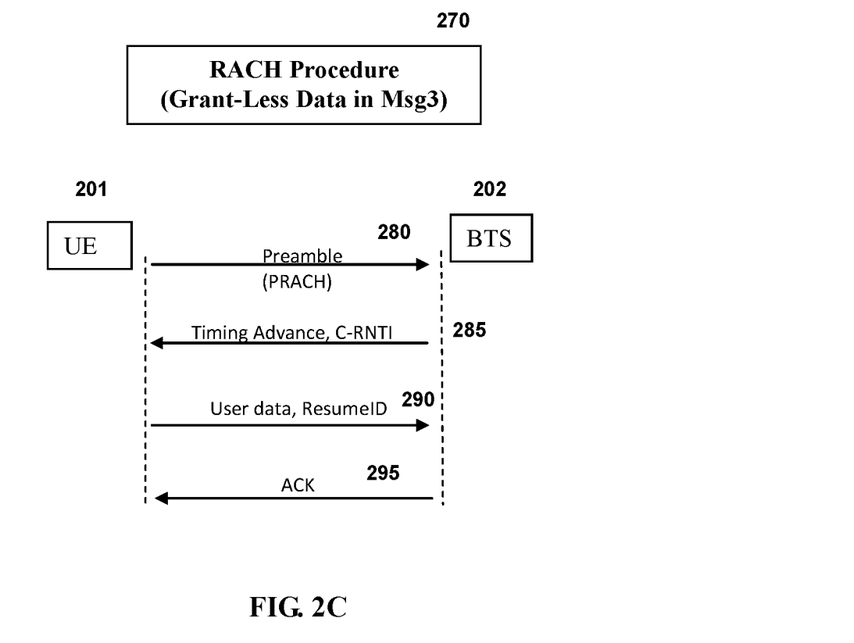
FIG. 2C illustrates a random access channel (RACH) procedure in accordance with embodiments of the present disclosure.

FIG. 2C illustrates a RACH procedure 270 which is performed using the procedure Grant-Less Data in Msg3, according to embodiments of the present disclosure. In Msg1 280 a preamble is sent (PRACH) from the UE 201 to the base transceiver station (BTS) 202, which responds in Msg2 285 with a timing advance (TA) and C-RNTI. The UE 201 subsequently, in Msg3 290, sends the data and Resume ID and the BTS 202 subsequently sends in Msg4 295, an acknowledgement or negative acknowledgement of the receipt of the data.

According to embodiments, when there is no more data to send, the UE will enter the Grant Free (GF) State where a release procedure can be performed to assign the Resume ID to the UE. With reference to FIG. 1, the release procedure is illustrated as No Data-Release Proc 125 and is illustrated by the arrow from the Connected state 110 to the Grant Free state 100.

Figure 2D:
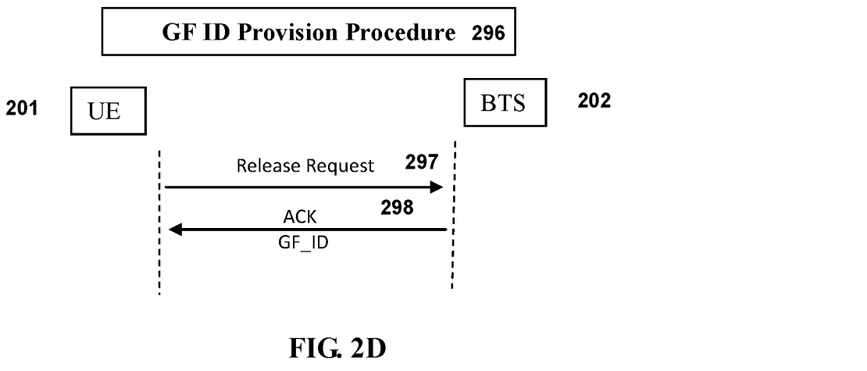
FIG. 2D illustrates a release procedure in accordance with embodiments of the present disclosure.

According to some embodiments, the BTS can assign a Grant Free ID (GF-ID) to the UE during the No Data Release Proc procedure. FIG. 2D illustrates a release procedure in accordance with embodiments of the present disclosure. The UE 201 sends a release request 297 to the BTS 202, wherein the BTS responds with an acknowledgement 298 together with a Grant Free identification (GF-ID) for potential subsequent use by the UE 201 for transmission of data.

According to embodiments, when a UE is in the GF state, which may be considered to be similar to the Idle state, the UE monitors the paging channel and conducts Idle state mobility management procedures, for example looking for the best cell for potential future communication, which occurs when a UE is in the Idle state.

According to embodiments, in the GF state, if a large amount of data (for example data >100 bytes) is required to be sent by the UE, the UE executes the normal RACH process, for example similar to the RACH process which would be performed by the UE when transitioning from the Idle state in order to transmit data. With reference to FIG. 1, the "large data" procedure is illustrated as Large Data/GF Failed RACH Proc 130 and is illustrated by the arrow from the Grant Free state 100 to the Connected State 110.

Figure 3:
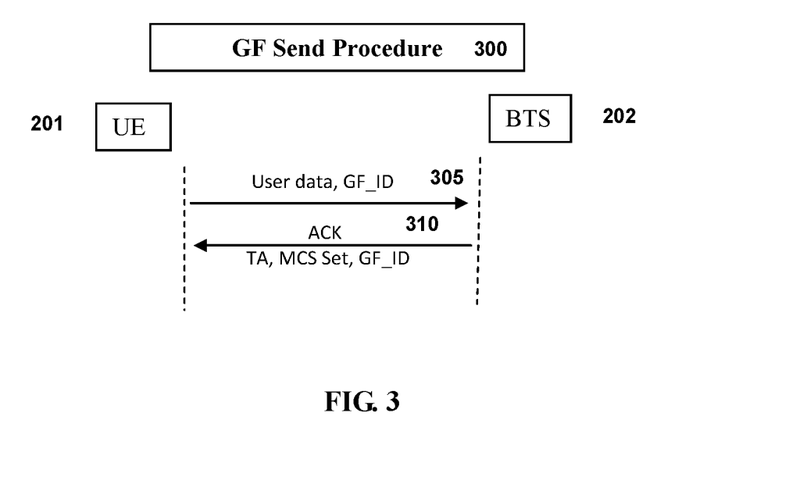
FIG. 3 illustrates a grant free (GF) send procedure in accordance with embodiments of the present disclosure.

According to embodiments, when the UE is in the GF state, and a small amount of data (for example, data <100 bytes) is required to be sent, the UE executes a GF Send procedure which is illustrated in FIG. 3. With reference to FIG. 1, the "small data" procedure is illustrated as Small Data/GF Send Proc 135 and is illustrated by the arrow loop from and to the Grant Free state 100.

It will be readily understood that the threshold defined for differentiating Large Data and Small Data as defined above is merely an example and other thresholds can be selected which can be dependent on for example, the communication system, connection quality and the like.

FIG. 3 illustrates a grant free (GF) send procedure 300 in accordance with embodiments of the present disclosure. Initially, the UE 201 sends data 305 together with the GF-ID assigned thereto to the BTS 202. The BTS 202 subsequently responds with an acknowledgement 310 or negative acknowledgement together with TA, a set of modulation and coding schemes (MCS) and the GF-ID. According to embodiments, the UE may transmit a long cyclic prefix together with the data and GF-ID. In some embodiments, the UE may transmit a preamble in advance of transmitting the data.

According to embodiments, the GF-ID can be a new ID assigned to the UE during the No Data Release_Proc RACH Procedure 125 illustrated in FIG. 1. In some embodiments, given that the GF-ID only needs to be unique within the BTS, the GF-ID can be a concatenated version of the resume ID, for example the GF-ID can be 20 bits for the unique UE ID. In some embodiments, the GF-ID can be the same as the C-RNTI. However, it is known that in LTE the C-RNTI is only 16 bits, and a GF-ID may need to have more than 16 bits in order to support the massive number of UEs being associated with a particular BTS. For example, if there are a million UEs or more associated with a BTS, a GF-ID of greater than 16 bits may be required. Accordingly, in this embodiment, a longer C-RNTI should be used.

According to some embodiments, scrambling of the user data message for transmission by the UE can use the C-RNTI or the GF-ID. Although other forms of encryption may be used provided that the process is known to or identifiable by the BTS.

Figure 4:
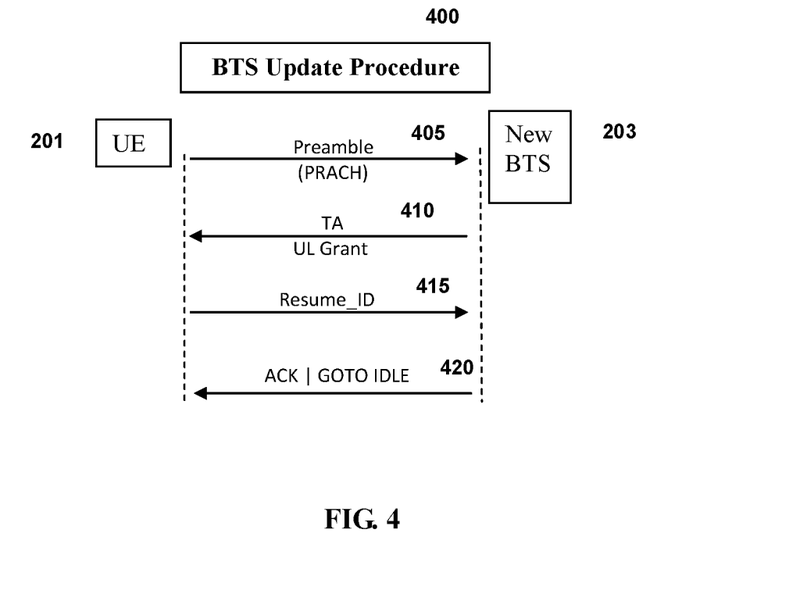
FIG. 4 illustrates a base transceiver station (BTS) update procedure in accordance with embodiments of the present disclosure.

According to embodiments, if the UE detects a stronger neighbouring BTS while the UE is in GF state, it is understood that the TA to the new BTS is unknown. Depending on how the UE is configured; the UE may initiate the BTS Update Procedure. FIG. 4 illustrates a base transceiver station (BTS) update procedure 400 in accordance with embodiments of the present disclosure. The UE 201 initially sends a preamble (PRACH) 405 to the new BTS 203, which responds with a TA and an UL Grant 410. The UE 201 subsequently sends a Resume-ID 415 and the new BTS 203 responds with an acknowledgement 420. With reference to FIG. 1, this procedure is illustrated as Hand off BTS Update Proc 140 and is illustrated by the arrow from and to the Grant Free state 100.

In some embodiments, when the UE initiates the BTS Update Procedure illustrated in FIG. 4 as described above the Acknowledgement sent by the BTS may further include operational instructions to the UE. As illustrated in FIG. 4 the new BTS responds with an acknowledgement 420 and instructions to the UE to go to Idle state. With reference to FIG. 1, this procedure is illustrated as Hand off/Moved BTS Update Proc 145 and is illustrated by the arrow from the Grant Free state 100 to the Idle state 105.

In some embodiments, the UE may drop into the IDLE state autonomously, however in this instance the network would not know if the UE is in GF state or IDLE state. Again with reference to FIG. 4, BTS update procedure includes the UE 201 initially sends a preamble (PRACH) 405 to the new BTS 203, which responds with a TA and an UL Grant 410. The UE 201 subsequently sends a Resume-ID 415 and the new BTS 203 responds with an acknowledgement 420. With reference to FIG. 1, this procedure is illustrated as Hand off BTS Update Proc 145 and is illustrated by the arrow from the Grant Free state 100 to the Idle state 105. According to this embodiment, the BTS Update_Proc has a similar purpose to a tracking area update, thereby notifying the network that the UE has moved from one BTS to another BTS.

According to embodiments, there is a trade-off between paging resources and UL resources. For example, in instances where a UE is infrequently paged, then it can be more efficient if the UE simply drops to the Idle state, such that when the UE is paged, it would need to be paged within the entire tracking area. However, if UE is frequently paged, optimizing paging resources can be desired. In this instance the network can instruct the UE to perform the BTS Update Proc so that the network knows exactly which sector or BTS to page the UE, thereby saving paging resources. In the instance where the UE is executing the BTS Update Proc frequently, for example in the instance where the UE is moving quickly, the network may instruct the UE to move to the Idle state from the Grant Free state, as in the Idle state mobility is tracked at a coarser level, for example tracking of the UE would be at the tracking area level.

According to embodiments, if the UE has determined it has moved away from a BTS such that the TA associated therewith is likely to be inaccurate, the UE is configured to move from the GF State to the Idle State. For example, with a 5.1 us cyclic prefix (CP) it can be important that the TA relative to other UEs is not more than this because then there can be interference between data transmissions. According to embodiments, the TA can be updated by the BTS after each access thereto by the UE, wherein the BTS can include a TA adjustment in the ACK message sent to the UE, for example the TA can be included in the acknowledgement sent by the BTS at the completion of the BTS Update Proc. In some embodiments, the BTS transmits a TA together with the acknowledgement of every interaction between the UE and the BTS.

A UE may not always be able to determine if it has moved away from the BTS with which it is associated, for example there is a level of inaccuracy with the determination of movement. According to embodiments, in this instance, the UE can execute the GF Send Procedure with an invalid TA. In this instance, the GF Send Procedure will likely fail. The UE can be configured to transfer from the GF State to the Connected State via the RACH Process upon a predetermined number of failed GF Send Procedures, or receipt of a predetermined number or plural GF Send Procedure fail notifications. By transferring into the Connected State the UE is thereby re-establishing an appropriate TA with the BTS.

As is known timing advance changes due to movement of the UE, drift of the clocks of the UE and BTS and also changes in delay spread, among other parameters. The UE is unable to know the cause of the change in TA. According to embodiments, in order for the UE to maintain a valid TA, the UE is configured to assume it has not moved and thus any changes in timing advance is assumed to be due to clock drift only.

According to embodiments, the UE can perform the following procedure for the evaluation of TA.

UE starts in the Idle state:
Before the RACH procedure, the UE synchronizes to the BTS signal=$T_A$
The UE then estimates a timing advance for the PRACH=$T_{Initial}$
The UE then sends the RACH out using $T_A+T_{Initial}$ The BTS responds with a timing adjustment TA= (Adj_TA) so the valid timing:

$T_{valid} = T_{Initial} + Adj\_TA$

The UE then sends the data out using $T_A + T_{valid}$

The UE has sent the data and no further data needs to be sent and the UE transitions to the GF state:

The UE sleeps for minutes or hours, during which period the clocks of both the UE and BTS will drift.

The UE wakes up and must re-sync with the BTS signal and due to clock drift the UE and BTS are now synchronized at $T_B$. The UE is configured to assume that the change from $T_A$ to $T_B$ is due only due to clock drift and not a change in position or delay spread.

The UE then sends the data out using $T_B + T_{Valid}$

According to embodiments, this new timing is valid, provided that it is within the CP defined, and thus some amount of movement of the UE is possible for this new timing to be valid.

According to embodiments, the UE can be configured to determine when it moved or how far it has moved or both. In some embodiments, the UE can be configured to use a location based service to determine its movement, for example using global position system (GPS) or based on the Cell ID. In some embodiments, the UE can be configured to use Enhanced Cell ID, wherein received signal strength measurements from neighboring cells can be used as a location "fingerprint", such that if the signal strength measurements have not changed (within a predefined tolerance level), there is a high probability that the UE has not moved or moved only slightly, thereby implying that the TA has not changed due to movement. For example, the TA adjustment determined above with respect to clock drift can be defined as correct if signal strength measurements are relatively unchanged. In some embodiments, the UE can be configured to use information collected by one or more accelerometers associated therewith in order to determine if movement of the UE has occurred.

In some interactions between a UE and an eNB or BTS there is a problem relating to unknown data volumes. It has been noted that Internet of Things (IoT) devices often send the same amount of information. As such, according to embodiments, the data volume for transmission by a UE (eg. IoT device) can be set, for example using the baseline RACH procedure or saved by the BTS after the RACH procedure for future reference. As such, during a GF Send procedure, the burden on the BTS to determine the amount of data can be minimized. However, if the data volume to be transmitted changes, the UE can be configured to transition from the GF state to the Connected State by executing the RACH procedure.

In some interactions between a UE and an eNB or BTS there is a problem relating to unknown time, frequency and/or Non-Orthogonal Multiple Access (NOMA) code mapping. It is understood that a possible NOMA code space can be very large. As such, according to embodiments, to reduce the number of possible blind decodes a BTS has to perform the set of possible NOMA codes can be reduced by assigning the UE a subset of NOMA codes and time and frequency resources in which to use them. This assignment to the UE can be performed during the transmission of the grant message in the RACH procedure. According to embodiments, in order to minimize the signaling, pre-allocated sets of resources can be mapped to the GF-IDs. For example, the system information block (SIB) in combination with a set of predefined rules which may be specified in a wireless communication standard, can provide this mapping of the GF-ID to the set of (Frequency, Time, NOMA codes) used to for the GF Send Procedure. According to embodiments, a GF-ID is configured to be uniquely assigned to a UE in association with a particular BTS. For example, the size of a pre-allocated set of resources for mapping to a GF-ID can be dependent on the BTS, and can be based on computation and congestion of the BTS, for example based on the number of users of the BTS.

In some interactions between a UE and an eNB or BTS there is a problem relating to an unknown modulation and coding scheme (MCS). It is understood that the problem can be related to the large set of blind decodes the BTS has to perform. According to embodiments, the Msg2 Grant transmitted during the RACH procedure can set a smaller range of possible MCS in order to reduce the number of potential BTS blind decodes. According to embodiments, in instances where coverage provided by the BTS goes beyond the initial MCS range, for example the UE has moved to a region of poor coverage, the UE can be configured to transition out of GF state and execute the RACH procedure to transition to the Connected state. In some embodiments, when the BTS has an estimate of the type of coverage it can provide to the UE, as part of the GF Send procedure the BTS can update the MCS set to a suitable set, wherein MCS set can be sent along with the acknowledgement.

In some interactions between a UE and an eNB or BTS there is a problem relating to acknowledgement confusion after collision of packet transmissions. According to embodiments, ACK confusion can be substantially eliminated by assigning every UE to a unique resource set, for example a unique set relating to NOMA code, Time and Frequency. However, this assignment of a unique resource set may result in a large number of blind decodes to be performed by the BTS. As such, the BTS may be configured to assign the same resource set to more than one UE. However, having multiple assignments of the same resource set may result in a collision, wherein one packet is decoded and the other packet is not. In this instance, if the BTS is configured to include the GF-ID in the Acknowledgement, respectively the UEs that used the same resource set will know which packet was decoded successfully as that UE's GF-ID will be included in the acknowledgement. The other UE upon receipt of the acknowledgement with the wrong GF-ID would therefore know what that the packet or packets transmitted thereby were not received by the BTS.

Various embodiments of the present disclosure may be implemented as a computer-implemented method, namely a method whose steps are implemented by computing devices such as by a combination of LTE network infrastructure devices such as eNBs or related infrastructure equipment as well as LTE wireless terminal UEs such as MTC UEs or other UEs. The method may thus be implemented in a distributed manner. The computing devices may implement the method by executing, by a microprocessor, computer instructions stored in memory and operating various electronics associated with and controlled by the computing devices accordingly. Additionally or alternatively, some or all of the operations of the computing devices may be executed by electronics executing firmware instructions or dedicated electronics hardware configured to operate in a predetermined manner when presented with predetermined patterns of electronic inputs.

Various embodiments of the present disclosure may correspond to a system comprising a combination of LTE network infrastructure devices such as eNBs or related infrastructure equipment as well as LTE wireless terminal UEs such as MTC UEs or other UEs. The system may be described in terms of interacting modules, wherein each module corresponds to a selection of electronic components operating together to produce an effect. Such a system is illustrated for example in FIG. 5, and described below.

Figure 5:
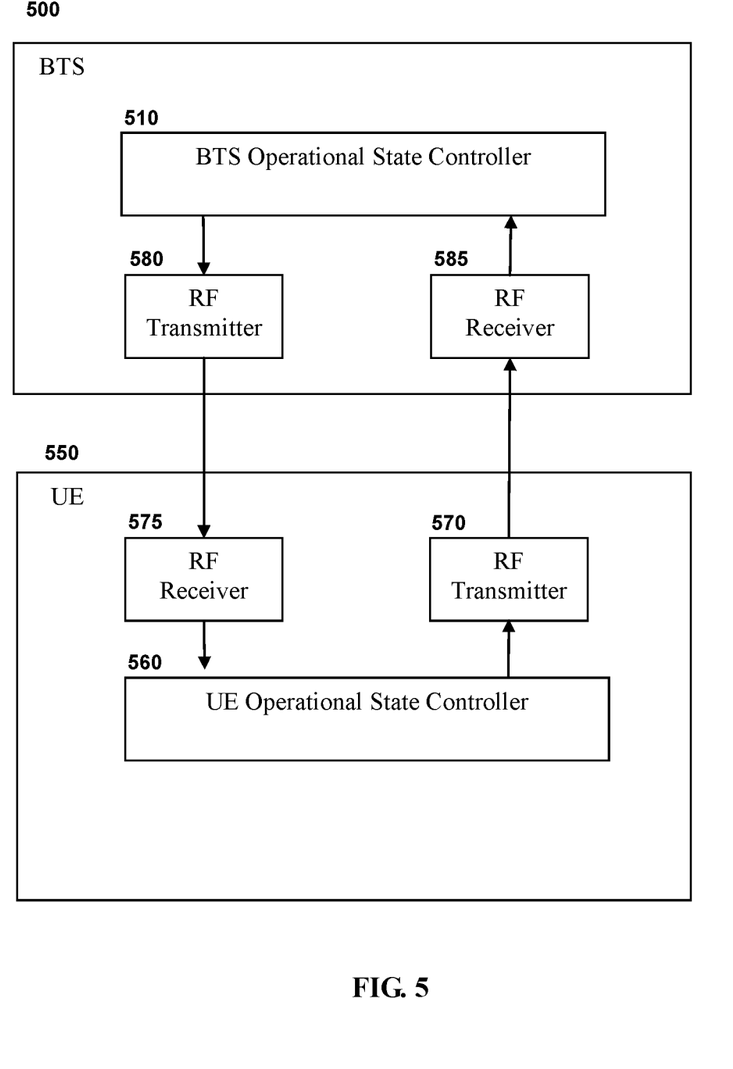
FIG. 5 illustrates a system including a UE and BTS or access node in accordance with embodiments of the present disclosure.

FIG. 5 illustrates a system comprising a base transceiver station (BTS) 500 and a user equipment (UE) 550 in a wireless communication system. The UE 550 comprises a UE Operational State controller 560, which is configured to manage the Operational State transitions of the UE. In some embodiments, the UE Operational State controller 560 is configured to actively manage state transitions of the UE, for example transitions of the UE to and/or from Connected state, Idle state and Grant Free state. The UE 550 further comprises various other features such as a wireless communication module, comprising a RF transmitter 570 and RF receiver 575, the wireless communication module configured to facilitate communication with the BTS via an appropriate protocol, such as LTE. Other functionalities of a UE configured to operate in accordance with a standard such as LTE would be readily understood by a worker skilled in the art. The operational state transitions provided by the UE Operational State controller 560 are transmitted to the BTS via the RF transmitter 570.

The BTS 500 comprises a BTS Operational State controller 510, which is configured to manage the operational state transitions of a UE at the BTS. In some embodiments the eNB Operational State controller 510 is configured to modify operational state conditions of a UE in light of instructions received from the UE. The BTS 500 further comprises various other features such as a wireless communication module, comprising a RF transmitter 580 and RF receiver 585, the wireless communication module configured to facilitate communication with the UE via an appropriate protocol, such as LTE. Other functionalities of a BTS configured to operate in accordance with a standard such as LTE would be readily understood by a worker skilled in the art.

The UE Operational State controller 560 comprises a microprocessor operatively coupled to memory, the memory having stored therein program instructions for execution by the microprocessor in order to perform Operational State controller operations as described herein. Operations can be performed based on logic statements, lookup table operations, or the like, or a combination thereof. Alternatively, other electronic circuitry, such as application specific integrated circuitry, logic array circuitry, or the like, can be used to perform some or all Operational State controller operations.

The eNB Operational State controller 510 comprises a microprocessor operatively coupled to memory, the memory having stored therein program instructions for execution by the microprocessor in order to perform Operational State controller operations as described herein. Operations can be performed based on logic statements, lookup table operations, or the like, or a combination thereof. Alternatively, other electronic circuitry, such as application specific integrated circuitry, logic array circuitry, or the like, can be used to perform some or all Operational State controller operations.

It will be understood that the term "base station" or "base transceiver station (BTS)" refers to an evolved NodeB (eNB), a radio access node, or another device in a wireless communication network infrastructure, such as an LTE infrastructure, which performs or directs at least some aspects of wireless communication with wireless communication devices.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments are examples and can be varied in many ways. Such present or future variations are not to be regarded as a departure from the spirit and scope, and all such modifications as would be obvious to one skilled in the art are intended to be included within the scope of the following claims.

We claim:

1. A method for transitioning a state of a User Equipment (UE), the method comprising:
   determining, by the UE, if data is to be sent;
   transitioning, by the UE, to a grant free state when no data is to be sent, wherein transitioning to the grant free state includes receiving a grant free identifier (GF-ID) and wherein the GF-ID is uniquely assigned to the UE in association with a particular base transceiver station (BTS) for transition to the grant-free state;
   in accordance with a determination that an amount of data is to be sent and the amount of data is below a threshold, transmitting, by the UE, the data together with the GF-ID; and
   in response to transmission of the data together with the GF-ID, receiving, by the UE, an acknowledgement together with a timing advance, wherein the UE is in the grant free state.

2. The method according to claim 1, wherein the UE receives a set of modulation and coding schemes together with the acknowledgement.

3. The method according to claim 1, further comprising:
   detecting, by the UE, a new base transceiver station (BTS); and initiating, by the UE, a base transceiver station update procedure with the new BTS.

4. The method according to claim 3, further comprising: receiving, by the UE, a timing advance and an uplink grant.

5. The method according to claim 1, further comprising: transitioning, by the UE, to an Idle mode; and initiating, by the UE, a base transceiver station update procedure.

6. The method according to claim 5, further comprising: receiving, by the UE, a timing advance and an uplink grant.

7. The method according to claim 1, further comprising: receiving, by the UE, plural GF send procedure fail notifications; and transitioning, by the UE, to a connected state.

8. The method according to claim 1, further comprising: detecting, by the UE, movement of the UE; and initiating, by the UE, a base transceiver station update procedure.

9. A user equipment (UE) comprising:
a processor; and
a memory having stored thereon instructions, which when executed by the processor configure the UE to:
  determine if data is to be sent;
  transition to a grant free state when no data is to be sent, wherein transitioning to the grant free state includes receiving a grant free identifier (GF-ID) and wherein the GF-ID is uniquely assigned to the UE in association with a particular base transceiver station (BTS) for transition to the grant-free state;
  in accordance with a determination that an amount of data is to be sent and the amount of data is below a threshold, transmit the data together with the GF-ID; and
  in response to transmission of the data together with the GF-ID, receive an acknowledgement together with a timing advance, wherein the UE is in the grant free state.

10. The UE according to claim 9, wherein the UE receives a set of modulation and coding schemes together with the acknowledgement.

11. The UE according to claim 9, wherein the instructions, which when executed by the processor further configure the UE to:
  detect a new base transceiver station (BTS); and
  initiate a base transceiver station update procedure with the new BTS.

12. The UE according to claim 11, wherein the instructions, which when executed by the processor further configure the UE to:
  receive a timing advance and an uplink grant.

13. The UE according to claim 9, wherein the instructions, which when executed by the processor further configure the UE to:
  transition to an Idle mode; and
  initiate a base transceiver station update procedure.

14. The UE according to claim 13, wherein the instructions, which when executed by the processor further configure the UE to:
  receive a timing advance and an uplink grant.

15. The UE according to claim 9, wherein the instructions, which when executed by the processor further configure the UE to:
  detect movement of the UE; and
  initiate a base transceiver station update procedure.

16. A method for receiving data from a User Equipment (UE), the method comprising:
  transmitting, by a base transceiver station (BTS), a grant free identifier (GF-ID) to the UE, wherein the GF-ID is uniquely assigned to the UE in association with the BTS for transition to the grant-free state;
  receiving, by the BTS, an amount of data together with the GF-ID, wherein the amount of data is below a threshold; and
  in response to receipt of the amount of data together with the GF-ID, transmitting, by the BTS, an acknowledgement together with a timing advance to the UE, wherein the UE is in the grant free state.

17. The method according to claim 16, wherein the BTS transmits a set of modulation and coding schemes together with the acknowledgement.

18. A base transceiver station (BTS) comprising:
a processor; and
a memory having stored thereon instructions, which when executed by the processor configure the BTS to:
  transmit a grant free identifier (GF-ID), wherein the GF-ID is uniquely assigned to the UE in association with the BTS for transition to the grant-free state;
  receive an amount of data together with the GF-ID, wherein the amount of data is below a threshold; and
  in response to receipt of the amount of data together with the GF-ID, transmit an acknowledgement together with a timing advance to the UE, wherein the UE is in the grant free state.

19. The BTS according to claim 18, wherein the BTS transmits a set of modulation and coding schemes together with the acknowledgement.

20. A method for transitioning a state of a User Equipment (UE), the method comprising:
  determining, by the UE, if data is to be sent;
  transitioning, by the UE, to a grant free state when no data is to be sent, wherein transitioning to the grant free state includes receiving a grant free identifier (GF-ID);
  when the UE is in the grant free state, in accordance with a determination that an amount of data is to be sent and the amount of data is below a threshold, transmitting, by the UE, the data together with the GF-ID; and
  in response to transmission of the data together with the GF-ID, receiving, by the UE, an acknowledgement together with a timing advance, wherein the UE is in the grant free state.

21. The method of claim 20, wherein the UE is assigned a subset of non-orthogonal multiple access (NOMA) codes and time and frequency resources in which to use the subset of NOMA codes and time and frequency resources.

* * * * *